United States Patent
Gainsboro

(12) 
(10) Patent No.: US 6,560,323 B2
(45) Date of Patent: May 6, 2003

(54) COMPUTER-BASED METHOD AND APPARATUS FOR CONTROLLING, MONITORING, RECORDING AND REPORTING TELEPHONE ACCESS

(75) Inventor: Jay L. Gainsboro, Framingham, MA (US)

(73) Assignee: T-Netix, Inc., Carrollton, TX (US)

( * ) Notice: Subject to any disclaimer, the term of this patent is extended or adjusted under 35 U.S.C. 154(b) by 0 days.

(21) Appl. No.: 08/904,784

(22) Filed: Aug. 1, 1997

(65) Prior Publication Data

US 2002/0071537 A1 Jun. 13, 2002

Related U.S. Application Data

(63) Continuation of application No. 08/510,327, filed on Aug. 2, 1995, now Pat. No. 5,655,013, which is a continuation of application No. 08/229,517, filed on Apr. 19, 1994, now abandoned.

(51) Int. Cl.[7] ................................................. H04M 3/00
(52) U.S. Cl. ........................ 379/188; 379/249; 379/199
(58) Field of Search ........................... 379/91.01, 91.02, 379/112, 143, 144, 145, 101, 108, 189, 196, 198, 199, 200, 34, 35, 207.01, 207.02, 207.11, 211.01, 211.02, 210.02, 211.03, 114.01, 114.14, 112.01, 144.01, 85.16

(56) References Cited

U.S. PATENT DOCUMENTS

| 3,851,121 A | | 11/1974 | Marvin |
| 4,001,513 A | * | 1/1977 | Naylor ........................ 379/115 |
| 4,002,848 A | * | 1/1977 | Stein ........................... 379/119 |

(List continued on next page.)

FOREIGN PATENT DOCUMENTS

JP 5-30193 5/1993

OTHER PUBLICATIONS

Bahl, L. "A Maximum Likelihood Approach to Continuous Speech Recovery", Readings in Speech Recognition Ed. A. Waibel and K. Lee, Morgan Kaufmann Publishers, pp 308–319, IEEE 1983.
Batten, A. "Personal Communications Service and the Intelligent Network", British Telecommunications Engineering, vol. 9, pp 88–91 Aug. 1990.
Lee, K. "Large–Vocabulary Speaker–Independent Continuous Speech Recognition Using HMM", Carnegie Mellon University Department of Electrical and Computer Engineering, CMU–CS–88–148 Apr. 1988.
System 20, Nov. 1992.
Telematic "ConQuest III Intimate Telephone System" Nov. 1992.
LazerVoice, Digital Recording System Inmate Services, 1997–98 Schlumberger Technologies, Inc./LazerVoice, STIL V0222 LazerVoice User's Manual—Version 2.22.
LazerPhone User Reference Manual.
LazerPhone, Inmate Telephone System, Users Manual, 1998 Schlumberger Technologies, Inc./Global Tel*Link, LazerPhone User's Manual—Version 1.0.
LazerPhone, Powerful Performance Uncompromising Standards, 1998.
LazerPhone Technical Manual, System Overview.

Primary Examiner—Fan Tsang
Assistant Examiner—Roland G. Foster
(74) Attorney, Agent, or Firm—Fenwick & West LLP

(57) ABSTRACT

A method and apparatus for managing institutional telephone activity utilizes a computer control unit to control a trunk management unit, which connects institutional telephones to outside telephone lines. The computer control unit contains a database for storing the calling privileges and restrictions of institutional users and for recording calling transactions made by the users. The computer control unit implements a prospective call screening feature whereby outside recipients of undesired calls from the institution may enter a code that directs the computer control unit to prohibit similar calls in the future.

22 Claims, 5 Drawing Sheets

U.S. PATENT DOCUMENTS

| | | | |
|---|---|---|---|
| 4,054,756 A | | 10/1977 | Comella et al. |
| 4,188,508 A | * | 2/1980 | Rogers et al. ............... 379/189 |
| 4,310,726 A | * | 1/1982 | Asmuth ...................... 379/207 |
| 4,518,825 A | | 5/1985 | Brinkhoff et al. |
| 4,559,416 A | | 12/1985 | Theis et al. |
| 4,602,129 A | | 7/1986 | Matthews et al. |
| 4,696,031 A | | 9/1987 | Freudberg et al. |
| 4,726,057 A | | 2/1988 | Doerry et al. |
| 4,799,255 A | | 1/1989 | Billinger et al. |
| 4,815,120 A | | 3/1989 | Kosich et al. |
| 4,885,765 A | * | 12/1989 | Shirakawa ............... 379/93.23 |
| 4,896,348 A | | 1/1990 | Grantland et al. |
| 4,899,375 A | | 2/1990 | Bauer et al. |
| 4,901,341 A | | 2/1990 | Carter et al. |
| 4,922,519 A | | 5/1990 | Daudelin |
| 4,922,520 A | | 5/1990 | Bernard et al. |
| 4,924,488 A | | 5/1990 | Kosich |
| 4,933,966 A | | 6/1990 | Hird et al. |
| 4,933,967 A | | 6/1990 | Lo et al. |
| 4,935,956 A | | 6/1990 | Hellwarth et al. |
| 4,937,862 A | | 6/1990 | Kosich |
| 4,993,068 A | | 2/1991 | Poisenka et al. |
| 5,023,869 A | | 6/1991 | Grover et al. |
| 5,023,906 A | * | 6/1991 | Novas ........................ 379/372 |
| 5,033,088 A | | 7/1991 | Shipman |
| 5,054,059 A | | 10/1991 | Stern et al. |
| 5,063,593 A | | 11/1991 | Kwon |
| 5,109,405 A | | 4/1992 | Morganstein |
| 5,131,024 A | | 7/1992 | Pugh et al. |
| 5,150,357 A | | 9/1992 | Hopner et al. |
| 5,163,083 A | | 11/1992 | Dowden et al. |
| 5,187,740 A | | 2/1993 | Swaim et al. |
| 5,200,995 A | | 4/1993 | Gaukel et al. |
| 5,222,120 A | | 6/1993 | McLeod et al. |
| 5,229,764 A | | 7/1993 | Matchett et al. |
| 5,276,731 A | | 1/1994 | Arbel et al. |
| 5,305,312 A | | 4/1994 | Fornet et al. |
| 5,309,505 A | | 5/1994 | Szlam et al. |
| 5,311,589 A | | 5/1994 | Bennett et al. |
| 5,319,702 A | * | 6/1994 | Kitchin et al. ............... 379/189 |
| 5,325,427 A | | 6/1994 | Dighe |
| 5,327,489 A | | 7/1994 | Anderson et al. |
| 5,329,578 A | | 7/1994 | Brennan et al. |
| 5,345,595 A | | 9/1994 | Johnson et al. |
| 5,351,287 A | * | 9/1994 | Bhattacharyya et al. . 379/93.02 |
| 5,355,403 A | | 10/1994 | Richardson, Jr. et al. |
| 5,375,161 A | | 12/1994 | Fuller et al. |
| 5,442,696 A | | 8/1995 | Lindberg et al. |
| 5,452,347 A | | 9/1995 | Iglehart et al. |
| 5,465,293 A | | 11/1995 | Chiller et al. |
| 5,471,519 A | | 11/1995 | Howe et al. |
| 5,483,582 A | | 1/1996 | Pugh et al. |
| 5,483,593 A | | 1/1996 | Gupta et al. |
| 5,535,261 A | | 7/1996 | Brown et al. |
| 5,539,812 A | | 7/1996 | Kitchin et al. |
| 5,566,229 A | | 10/1996 | Hou et al. |
| 5,583,934 A | | 12/1996 | Zhou |
| 5,606,604 A | | 2/1997 | Rosenblatt |
| 5,617,471 A | | 4/1997 | Rogers et al. |
| 5,627,887 A | | 5/1997 | Freedman |
| 5,651,056 A | | 7/1997 | Eting et al. |
| 5,655,013 A | * | 8/1997 | Gainsboro ................... 379/188 |
| 5,722,418 A | | 3/1998 | Bro |
| 5,724,404 A | | 3/1998 | Garcia et al. |
| 5,745,553 A | | 4/1998 | Mirville et al. |
| 5,796,811 A | | 8/1998 | McFarlen |
| 5,799,068 A | | 8/1998 | Kikinis et al. |
| 5,805,685 A | | 9/1998 | McFarlen |
| 5,809,125 A | * | 9/1998 | Gammino ................... 379/189 |
| 5,883,945 A | | 3/1999 | Richardson et al. |
| 5,960,064 A | | 9/1999 | Foladare et al. |
| 6,052,454 A | | 4/2000 | Kek et al. |
| 6,072,860 A | | 6/2000 | Kek et al. |
| 6,141,406 A | | 10/2000 | Johnson |
| 6,188,751 B1 | | 2/2001 | Scherer |

* cited by examiner

FIG. 3

| DATE 11-JAN-92 | INMATE INFORMATION | FORM CODE S IMM_INFO.2 |

31 — 
REGISTER # 11111101
NAME (L,F,M) CHEN          LEE           PHONE
LIVING UNIT  NA            MAILBOX 123445   STATUS A      ACCESS   183771450
COMMENTS                                                   CODE
SCHEDULE    U  ALERT N  DENY CALLS N  ENABLE  02-DEC-91   CHARGE   D
DELETE      N  DATE              ENTRY DATE   02-DEC-91   SORT     1234
LANGUAGE    EN                                             BALANCE          $.03

32 —
———TRANSACTIONS———                                    ———PHONE NUMBERS———
DATE        TYPE   AMOUNT     UPDATED       PHONE NUMBER    TYP ALRT ATTY CHRG
19-DEC-91   MANU   -$238.02   02-DEC-91     877-6787         A   N    N    D
19-DEC-91   MANU   $119.02    02-DEC-91     01144473808I     A   N    N    D
19-DEC-91   MANU   $12.00     02-DEC-91     5754541          A   N    N    D
19-DEC-91   MANU   $14.00     02-DEC-91     3018348926       A   N    N    D
                                            7035907655       A   N    N    D

33 —
———CALLS———
02-DEC-91   CALL   -$1.44
02-DEC-91   CALL   -$.21
02-DEC-91   CALL   -$3.32

34 —
F1=HELP     F3= MENU    F5= COMMIT              F8=CANCEL        TERMINAL PTS:000
ENTER THE REGISTER NUMBER OF THE INMATE
COUNT: 1                                                         (LIST)(REPLACE)

COMPUTER-BASED METHOD AND APPARATUS FOR CONTROLLING, MONITORING, RECORDING AND REPORTING TELEPHONE ACCESS

This is a continuation of application Ser. No. 08/510,327, filed Aug. 2, 1995, U.S. Pat. No. 5,655,013, which is a continuation of application Ser. No. 08/229,517, filed Apr. 19, 1994, now abandoned.

FIELD OF THE INVENTION

The present invention relates generally to the fields of telecommunications and penal institution management. More particularly, the invention relates to a computer-based method and apparatus for controlling, monitoring, recording and reporting access to outside telephone lines in a controlled, institutional environment, such as a prison, military base, hospital, school, business or government organization.

BACKGROUND OF THE INVENTION

Generally, the need to control access to outside telephone lines in an institutional environment is well recognized. In order to prevent individuals from incurring large, unaccountable telephone costs which the institution ultimately bears, one must either restrict access to outside telephone lines or institute accounting controls whereby the costs of unauthorized calls can be billed to the responsible individuals.

Telephone systems in correctional environments require additional security considerations. Without appropriate controls on telephone access, inmates have been known to use the telephones to harass outside parties (such as witnesses who testified against them, attorneys who prosecuted their case, employees of the courts, etc.), to perpetrate fraudulent schemes, and to participate in criminal conspiracies (such as arranging the smuggling of contraband into the prison, directing an outside criminal enterprise, plotting escape attempts or credit card fraud). Therefore, it is critically important for correctional management officials to carefully plan, control, monitor and record inmate access to outside telephone lines.

One of the most fundamental problems—which exists both in correctional and other business-oriented institutions—is cost control. To achieve cost control, it is critical that there be individual accountability for each call that incurs a charge to the institution. Such accountability is typically achieved through use of personal identification numbers ("pins"). Before making a call from an institution telephone, an individual must enter his PIN. The telephone service provider is then able to deliver to the institution an end-of-the-month telephone bill which lists, in addition to the cost of each call, the PIN or name of the individual who made the call. From this information, the institution can then collect reimbursement from individuals for the costs of certain calls.

While this system of end-of-the-month call accounting functions reasonably effectively in a business like environment, it does not work well in a penal institution. The reason is that inmates show little concern for phone bills they can't afford to pay. Thus, the institution is often forced to absorb the costs of phone calls by its delinquent inmates. Moreover, the fact that account balances are only computed periodically—i.e., every month, week, or even every day—permits the inmate to accrue large, uncollectible phone bills before his access to the phones can be terminated.

Traditionally, penal institutions have addressed this problem by restricting inmates to collect calls only. This, however, still provides the inmates with relatively unlimited access to the outside world, leaving open numerous opportunities for fraudulent and criminal activity, as explained below. Therefore, in a penal environment, it is highly desirable to regulate phone access on an individual, pay-in-advance basis, and to immediately and automatically terminate an individual's phone access when his/her paid-up account reaches a zero balance.

Another problem in penal institutions is the inmates' desire to make threatening or harassing phone calls to witnesses, prosecutors, police officers, parol officers, psychologists, judges, and the relatives and family of such persons. Limiting the inmates' access to collect calls only does not effectively address this problem, since an inmate can easily identify himself (to an operator) as someone from whom the recipient would likely accept a collect call. Rather, one should, at a minimum, provide a means that permits a potential call recipient to identify the caller as an inmate before accepting the call, whether that call is placed on a prepaid or collect basis. Conventionally, this is done by initially placing the inmate on hold and playing a prerecorded message telling the recipient that a call has been placed from a correctional facility and that, if the recipient wishes not to receive the call, he/she should hang up before the call is connected. This approach mitigates, but does not fully solve, the harassment problem. In particular, it is still possible for an inmate to repetitively call an outside party; even if the recipient hangs up after hearing the pre-recorded message, the harassing effect of receiving repetitive calls from inside the correctional institution remains. Therefore, it would be highly desirable to provide an institutional telephone system that automatically prohibits inmates from attempting to call certain outside persons. Moreover, it would also be highly desirable to provide a method and apparatus for allowing a recipient of an undesired call from an inmate to easily and automatically prohibit all future calls from that particular inmate, or from all inmates generally.

Still another concern in correctional institutions is the regulation of access to telephone systems. For various security and management reasons, it often desirable to restrict a given inmate's telephone access to particular phones, calling times, and to limit the length of calls, number of calls, and number of calls to the same number. Also, to enhance security and discipline, it should be possible to instantaneously revoke an inmate's calling privileges, or to otherwise modify the extent of a particular inmate's calling privileges.

Correctional institutions also typically wish to monitor and/or record outgoing calls. Inmate-to-attorney calls, however, cannot legally be monitored or recorded. Moreover, certain inmates—those who represent particular security risks—deserve live monitoring, as opposed to mere recording. Thus, it would be highly desirable to have a system which automatically initiates the appropriate monitoring and/or recording depending upon the identity of the inmate placing a call and the recipient of the call (i.e., attorney or non-attorney). Likewise, it may be desirable that calls to certain numbers are to be monitored live, while others need only be recorded.

Because the message content of inmate-to-attorney calls cannot be legally recorded or monitored, such calls can serve as a conduit for the inmate's illegal telephone activity. Therefore, it would be highly desirable to have a system which could passively—that is, without in any way monitoring or recording what is actually being said—monitor inmate-to-attorney calls to ensure that: (1) the only two people speaking on the line are the inmate and attorney, and/or (2) no DTMF tones, rapid line impedance changes, off-hook conditions or voltage spikes appear on the line. Techniques for voice identification are known—i.e. U.S. Pat. Nos. 4,993,068, entitled UNFORGEABLE PERSONAL IDENTIFICATION SYSTEM and 5,150,357, entitled INTEGRATED COMMUNICATIONS SYSTEM, both incorporated herein by reference—but have not been previously used in penal telecommunications applications.

SUMMARY OF THE INVENTION

In light of the above, one object of the invention is a method of managing telephone activity in an institutional environment to achieve improved security and reduced cost. Another object of the invention is a system adapted to perform such improved institutional telephone management.

Still another object of the invention is a method and apparatus for allowing outside recipients of calls from an institution to decide, in advance of connecting the call, whether to accept the given call and whether to block calls from that person and/or others within the institution or related institutions in the future, and optionally, whether to indicate to the inmate that the call has been either temporarily or permanently blocked by a particular party, including the prison administration, or the actual party called by the inmate, or that the number called by the inmate can not be reached for any number of reasons, as established by the prison administration, or the actual party called by the inmate.

Yet another object of the invention is a method and apparatus for passively monitoring a telephone connection to detect security breaches.

A still further object of the invention is an institutional telephone management system wherein the parameters that control the operation of the system as well as the records of system activity are stored in a central database, thereby permitting simple customization of system operation, generation of reports and monitoring of status.

In accordance with one aspect of the invention, a method of managing telephone activity in an institution includes the steps of: (1) identifying an institutional caller (the "calling party") who wishes to place an outside call to an outside recipient (the "called party"); (2) blocking the institutional caller and—while the institutional caller's line (earpiece and/or mouthpiece) remains blocked—(a) calling said outside recipient (called party), (b) providing the identity of said institutional caller to said outside recipient and (c) receiving a control code from said outside recipient; and (3) determining, in response to said control code, whether to connect the institutional caller to the outside recipient, and optionally, whether to indicate any of a plurality of messages to the calling party, e.g., an inmate. The control code preferably comprises a series of DTMF tones, for example the sequence 4688, which spells the pneumonic "GOTU". In response to the recognition of a control code, the outside recipient is provided with the option (via a voice prompt menu) of prohibiting any future calls from the particular institutional caller or, if desired, prohibiting calls from any person within the institution and/or related institutions. Alternatively, if voice prompting or voice menus are not available or not desired, then the public-at-large can be informed that the "GOTU" feature is available in their area, and with respect to certain institutions in their area, and then, upon receipt of undesired calls from such institutions, the called party can enter the "GOTU" touchtone or keypad sequence. Any multitude of call prohibitions can be established as to any particular inmate by the prison administration or the called party, including total blocking based on the called party's telephone number, blocking during particular time periods, blocking based on the class of the crime associated with a particular inmate, etc.

In accordance with another aspect of the invention, an apparatus for managing telephone activity in an institution includes: a plurality of institutional telephones located within the institution; a trunk management unit (TMU) for selectively connecting the institutional telephones to one or more outside telephone lines, wherein the TMU includes means for decoding DTMF tones generated by the institutional telephones or received from the outside telephone lines; and a computer control unit (CCU), coupled to the TMU, for controlling the connection of the institutional telephones to the outside telephone lines based upon DTMF tone(s) received from the outside telephone lines. A database associated with the CCU contains information regarding the calling privileges of each person within the institution. In a preferred embodiment, the TMU—prior to connecting the call—plays an announcement to the called party identifying the institution and caller, along with the options available to the called party. In response, the called party may enter the announced DTMF tone sequence (preferably GOTU), which modifies a record in the database, thereby prohibiting the caller (and/or other similarly situated prospective callers) from calling the called party in the future.

Other features of the TMU provide security and monitoring functions. The invention provides three levels of monitoring, any or all of which may be active for any given call. The first level is "live" call (voice) monitoring, where the prison officials actively listen to a live call. The second level is call recording. The TMU can be programmed to enable associated recording equipment to record telephone calls. The third level is "passive" line monitoring, where the TMU detects, for example, DTMF tones, off-hook conditions, voltage spikes and/or sudden line impedance changes, in order to thwart attempts at unauthorized three-way calling, call conferencing, call transferring, call forwarding or re-dialing via various alternate common carriers, many of whom now offer "1-800" or local telephone number (e.g., "950") access numbers. Also, care is taken to avoid disrupting calls that do not represent security breaches, by preventing false triggering of the above "passive" line monitoring features. For example, with respect to DTMF tone blocking, the TMU will look for any additional digits entered by an institutional caller, such as an inmate, to prevent the inmate from redialing to other telephone numbers that may not be authorized. However, to prevent "talkoff", whereby the normal telephone conversation can falsely trigger a disconnect signal (because the TMU may interpret the conversation as DTMF dialing), the TMU can be set to look at the number of digits dialed within a specified time period (e.g., six (6) digits within a fifteen (15) second time period, or any variation of the two parameters) and thereby, determine whether the audio information is indicative of unauthorized DTMF redialing or just a normal speech or voice pattern.

In accordance with the preferred embodiment of the invention, all calls are passively monitored and all calls that can be legally recorded—i.e., all but inmate-to-attorney calls—are recorded. At any time, prison officials can selectively invoke live monitoring to listen in on any call in progress, except an inmate-to-attorney call. System alarms, which trigger any time a particular inmate places a call or calls a certain person, allow officials to determine when live call monitoring is appropriate. Likewise, the telephone system of the present invention can be programmed to default in any manner. For example, the system can be set to place only those telephone calls that are among a preapproved list of telephone numbers. Conversely, the system can be set to place all telephone calls except those that are among a list of restricted telephone numbers. Optionally, the telephone system of the present invention can include speed-dialing, whereby upon entering a PIN, for example, an inmate can enter "11" followed by the "#" key. In that case, the prison administrator may have established that "11" is the speed-dialing sequence for that inmate's mother. Of course, the system could be configured so that the inmates themselves can program the telephone system with speed-dialing digits, however, a principal objective of speed-dialing is to save time at the telephone, thus making the telephones available to the largest number of inmates in the shortest possible time period.

In addition, the invention may include biometric voice verification features. The TMU, for example, may digitize a sample of the caller's voice. The CCU then compares the digitized sample with a stored voice print, to verify the identity of the caller. Such biometric monitoring may also be used in a passive call monitoring mode, wherein periodic samples of the caller's voice are provided to the CCU—and checked against a list of authorized voice prints—to ensure that no unauthorized callers are participating in a call, and to ensure that inmates are not sharing or selling relatively liberal calling privileges associated with a particular PIN or inmate account to other inmates that are subject to more limited calling privileges. The use of biometric voice verification (or "voice prints") can prevent PIN abuse in general. For example, if a particular inmate with restricted calling privileges, or no available funds, attempted to force (e.g., by threatening physical attack) another inmate with relatively non-restricted calling privileges (or available funds) to turn over his PIN, biometric voice verification would obviate this problem, as the voice would be used to validate entry into any inmate account.

BRIEF DESCRIPTION OF THE DRAWINGS

The detailed description below describes the preferred embodiments of the invention and is intended to be read in conjunction with the set of drawings, in which:

FIG. 3 is an exemplary screen showing an institutional user's calling privileges and activity;

DETAILED DESCRIPTION OF THE PREFERRED EMBODIMENTS

The preferred embodiment(s) will be described with reference to prison based call management. This, however, should not be viewed as limiting, since the invention is also applicable in other institutional settings such as military bases, schools, mental institutions and business organizations.

Figure 1:
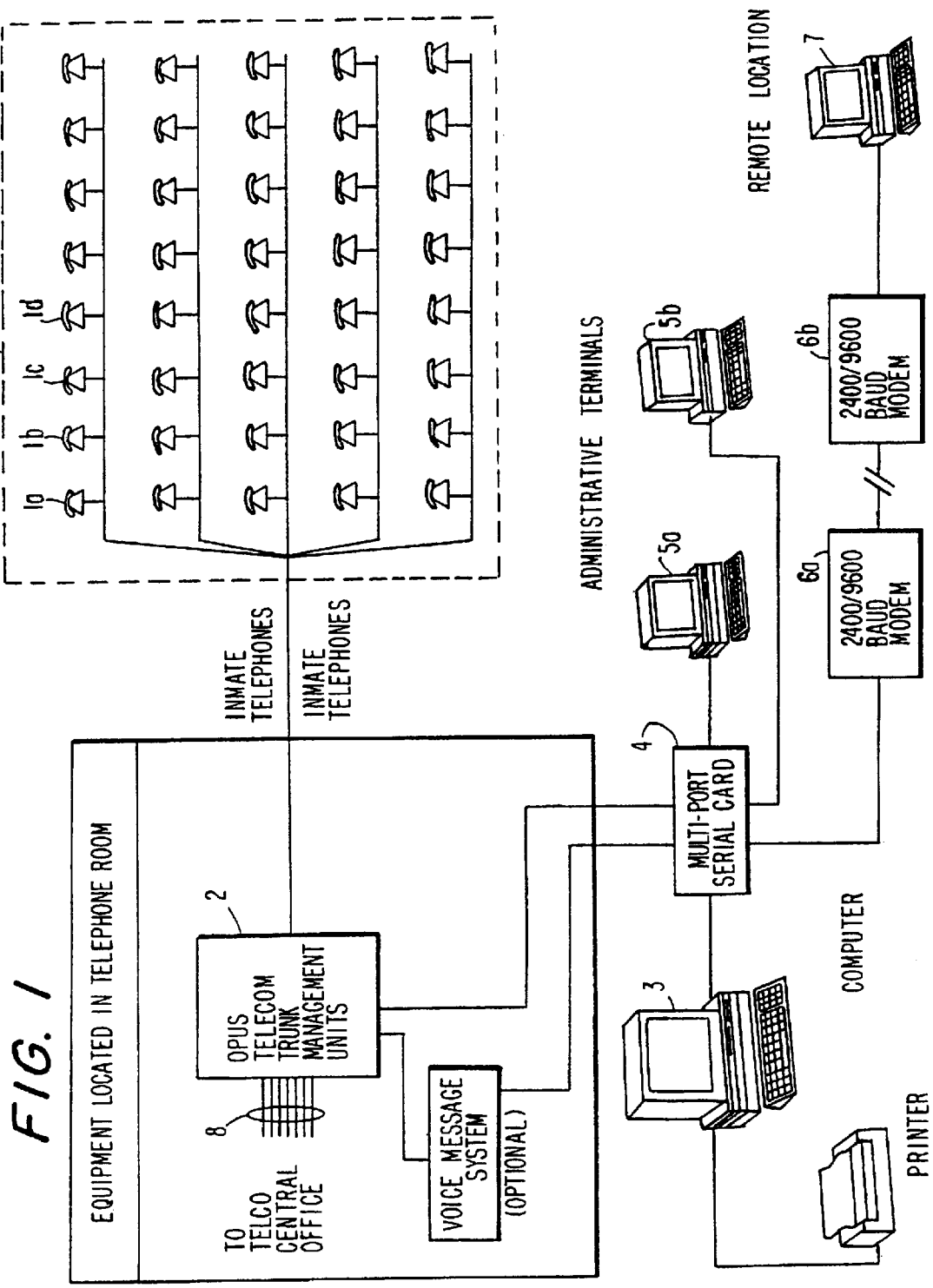
FIG. 1 is a block diagram showing the major components of a preferred apparatus, including a plurality of institutional telephones, a computer control unit (CCU) and a trunk management unit (TMU)

Referring now to FIG. 1, a call management system manages calls from a plurality of inmate telephones 1. A TMU 2 controls the connection of individual inmate telephones (for example 1a) to outside telephone lines 8, and electronically monitors connected calls. A TMU 2 can optionally contain (and/or be connected to external) voice messaging or voice synthesis equipment, to facilitate features such as over-the-phone voice prompting, voice mail, or any voice activated, responsive or interactive telephone feature. For example, an inmate could enter his/her PIN into a telephone 1 keypad, and then, access his/her account. In turn, voice equipment associated with or contained within the TMU could inform the inmate of the exact balance available in his/her account for future telephone calls. Additionally, the inmate could ascertain how much any prior telephone call has cost, and further, could dial an intended telephone call, and ascertain how much that call will cost for the first time period (e.g., the first minute), or, find out how many minutes the inmate can be connected to that telephone number, given the cost of that call and the amount remaining in the inmate's account, all prior to actually completing the call and becoming obligated to pay for it. Obviously, for debit-based systems, inmate calls will not be placed in the event that sufficient funds are not available. Further, if during a call connection, inmate funds become nearly exhausted, a warning tone could inform the inmate of that condition, so that the inmate can terminate the conversation, and take appropriate steps to replenish his/her account. Such warning tones could be made possible by a real time call cost monitoring system, that compares inmate call costs and inmate account balances while each call is in progress.

A serial interface card 4 digitally interfaces TMU 2 to: a CCU 3, one or more administrative terminals 5a–b and, via data modems 6a–b, to a remote terminal 7. Of course, remote terminals 7, administrative terminals 5 and CCUs 3 can be connected via so-called dedicated data/telephone line services, obviating the need for actual modems 6.

TMU 2 communicates bi-directionally with CCU 3. In one direction, CCU 3 directs TMU 2 to connect, record, passively monitor and terminate calls, and to download and/or play prerecorded messages to an inmate or outside call recipient. In the other direction, TMU 2 monitors the real-time status—i.e. off-hook, DTMF tones, voltage spikes and rapid impedance changes—of institutional and outside telephone lines. In addition, TMU 2 can provide digitized voice samples to CCU 3 in order to record messages (such as the inmate's name) and to support biometric voice verification or monitoring functions. Optionally, TMU 2 (or other comparable apparatus) could be configured to provide digitized voice samples to, for example, CCU 3, for each call made, whereby such samples are sufficient in length to provide verification that the inmate indeed participated in a conversation with a particular called party on a particular date and at a particular time. Because prison administrators may not wish to charge inmates (or in the case of collect calls, called parties) for certain calls (for example, calls the administrator deems incomplete), it is critical that administrators have the ability to verify actual telephone communications. Incomplete telephone calls may include, for example, busy signals, calls that do not "go through", calls that are not answered (as distinct from calls that reach answering machines, which may be deemed complete), etc. Thus, if an inmate or a called party subsequently claims that a particular telephone communication never occurred (e.g., a busy signal was reached, the called party never answered, or no voices were spoken at all), the prison administer can retrieve the voice verification record to evaluate whether, e.g., a credit is due, telephone system repair is required, or whether claims that certain calls were incomplete are false.

Figure 2:
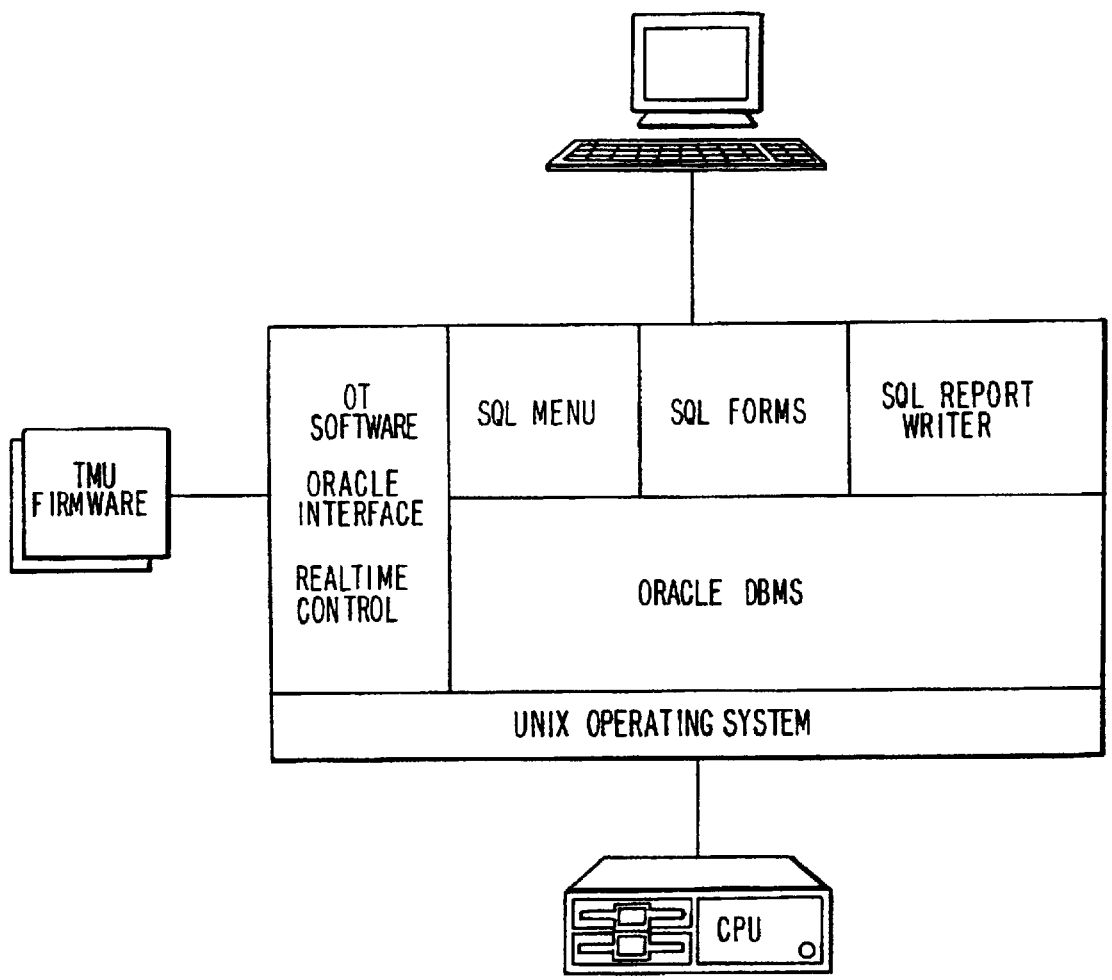
FIG. 2 is a block diagram showing the software and firmware architecture of the apparatus.

Referring now to FIG. 2, CCU 3 is preferably a "486" personal computer or larger "super-mini" type computer configured to operate under a suitable operating system, such as UNIX™ System V. Of course, any number of operating systems will be suitable for the purpose of the present invention. In addition to the operating system, a database management system (DBMS), such as ORACLE™, which includes a structured query language (SQL) interface, is used to store system configuration and status information. An SQL forms generator provides access to the stored configuration and status information. An SQL menu program allows users to easily navigate the database system. An SQL report writer is used to generate reports of calling activity or other system usage.

TMU firmware controls the operation of TMU 2. TMU interface software in CCU 3 is configured to manage communication between TMU 2 and CCU 3. ORACLE interface software provides a simple, menu based interface to field users such as correctional officers and management officials. Real-time control software manages the real-time activity of the system and responds to communications from TMU 2 and user inputs from CCU 3 or terminals 5a–b and 7.

From an administrator/user perspective, the CCU software supports the following general functions:

(1) establishment and configuration of individual inmate data and monetary accounts;

(2) checking of inmate debit (i.e. paid-in-advance) accounts;

(3) setting of global (i.e. institution wide) and individual restrictions on telephone access;

(4) real-time monitoring of inmate telephone calls and alerts (based on call content, security breaches, etc.), along with the ability to cut off inmate calls individually or globally;

(5) storing and reporting of detailed inmate call details and account information; and (6) storing and reporting of telephone usage data.

Referring now to FIG. 3, an exemplary form 30 provides easy access to various information regarding an inmate's debit account, calling privileges and calling activity. The FIG. 3 form includes a title segment 31, which displays the current date, title of the form and form code. Below the title segment is a header segment 32, which typically displays such information as the inmate's name, registration number, preferred language selection, prisoner account code ("PAC", or PIN), certain calling privilege information and account balance. Below the header are a plurality of data blocks 33, which show the inmate's transactions (both accounting transactions and phone calls) as well as his/her calling privileges and restrictions—i.e., numbers the inmate is allowed to call, the inmate's attorney's number, numbers the inmate is prohibited from calling, and numbers which should trigger an alert on the system terminals when a call is attempted. The system allows the user to scroll through the data blocks in order to bring any particular transaction or restriction into view. A help line 34 lists the commands available to the user. A bottom positioned status line 35 completes the form.

Figure 4:
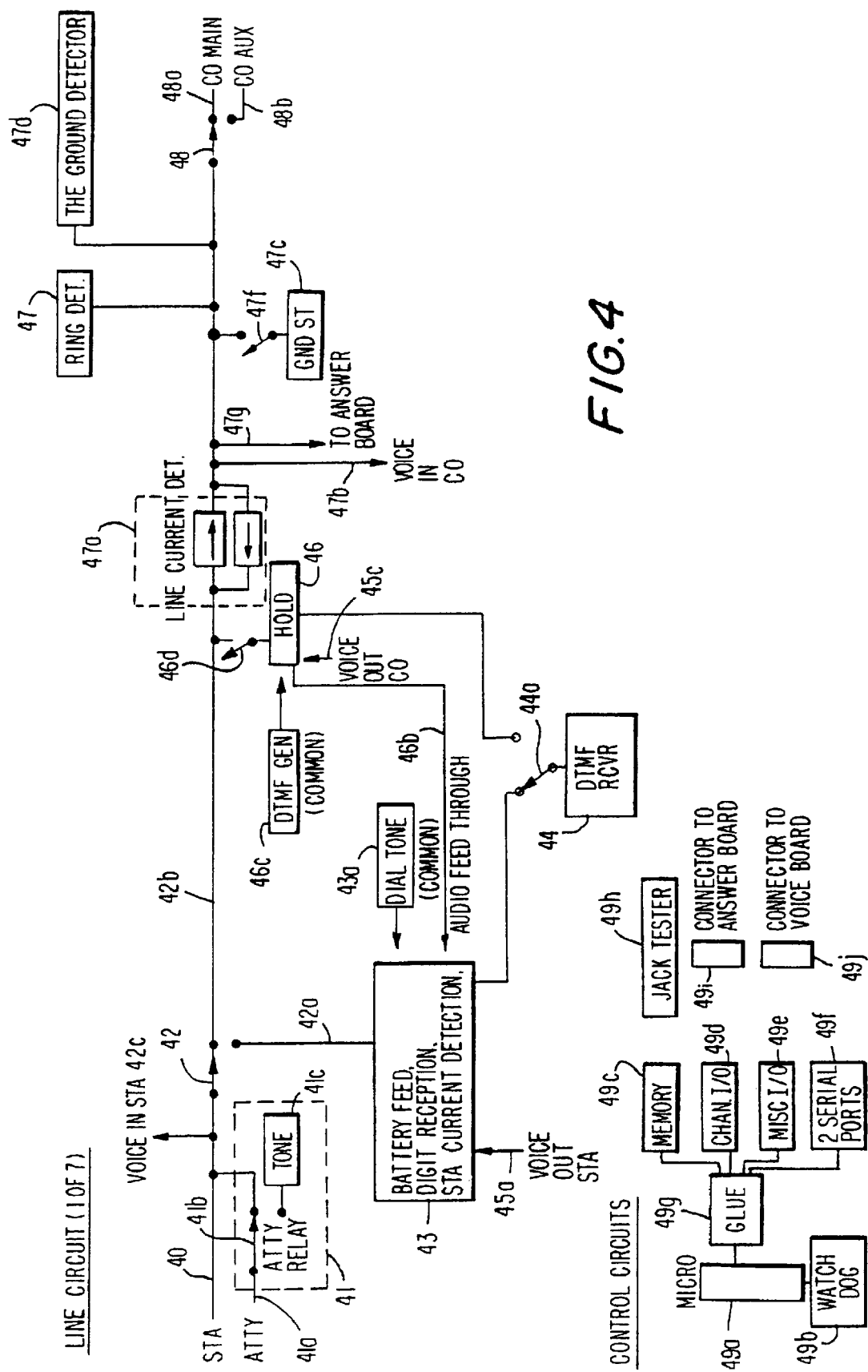
FIG. 4 is a block diagram of a TMU.

Referring now to FIG. 4, a block diagram of one channel of a multichannel TMU 2 is shown. Generally, TMU 2 includes circuitry to selectively connect inmate phones with outside lines, to selectively monitor and record the connection, and to generate appropriate voice instructions or prompts to the inmate and/or the outside call recipient.

As depicted in FIG. 4, a channel of TMU 2 connects to an inmate telephone 1 at a station input line 40. A record blocking circuit 41 connects station input line 40 to recording equipment (not depicted) via line 41a (which line can also be used for "live" call monitoring). CCU 3 automatically controls an attorney relay 41b and, in the case of an inmate-to-attorney call, switches line 41a to a tone generator 41c, thereby blocking improper attempts to record or monitor inmate-to-attorney calls.

A split relay 42 switches the inmate telephone between a local line 42a and an outside line 42b. Initially (i.e. before the inmate initiates a call), split relay 42 connects station input line 40 (via local line 42a) to a monitor circuit 43, which monitors the inmate's telephone. Monitor circuit 43 supplies a battery feed to the inmate's telephone, and performs pulse digit recognition and current detection as well. A dial tone generator 43a (which is preferably common to all channels of the TMU) supplies a dial tone to the inmate's phone. A relay 44a switches a DTMF receiver 44 to decode tones on the local line 42a or the outside line 42b. A voice-out-station line 45a supplies voice messages to the inmate's telephone. CCU 3 controls the decoder portion of an integrated coder/decoder (CODEC) circuit to generate the messages fed to line 45a. (The decoder portion of a second CODEC also drives a voice out central office line 45c to play messages to outside line 42b.) A central office voice input line 47b connects to the coder portion of the CODEC circuit to support message recording, voice monitoring and/or verification functions. Optionally, voice-in-station 42c is used to record the name of an inmate. Also optional, answer board line 47g is used to detect called party answer conditions, by detecting the presence or loss of call progress tones (e.g., ringing, busy, special-information-tones (SITs), etc.).

A hold circuit 46 is used to interact with the outside caller during the call qualification process, during which the station input line 40 is switched to local line 42a. A hold relay 46a selectively connects hold circuit 46 to outside line 42b. A DTMF generator 46c (preferably common to all channels of the TMU) is controlled by CCU 3 to, for example, place an outside call to a requested number. Hold circuit 46 interfaces with DTMF receiver 44 to detect tones generated by the outside caller during the call qualification process. The hold circuit 46 (with its associated relay 46d) can also pass audio information directly to the monitor circuit 43 as desired via audio feed through line 46b. The hold circuit 46 can also be used for dial-pulse dialing to the central office. Line current detector 47a (preferably implemented using an opto-isolator), ring detector 47e, and tip/ground detector 47d monitor the status of outside line 42b. Ground start relay 47f connects a ground start circuit to the ring wire of outside lines 48a and 48b, to start "ground-start" type lines. A line relay 48 switches outside line 42b between a central office main line 48a and a central office auxiliary line 48b.

In addition to the channel circuitry described above, TMU 2 is controlled by a microprocessor 49a, which interfaces with a watchdog timer 49b and with a memory 49c, channel I/O 49d, miscellaneous I/O 49e and dual serial ports 49f via data, or so-called "glue" logic 49g. TMU 2 also includes a jack tester circuit 49h and connectors 49i and 49j to answer and voice boards, respectively. The voice board contains a plurality of integrated CODECs (preferably two per TMU channel) as well as circuitry needed to permit CCU control of the CODECs, including I/O circuitry and voice data buffers.

Figure 5:
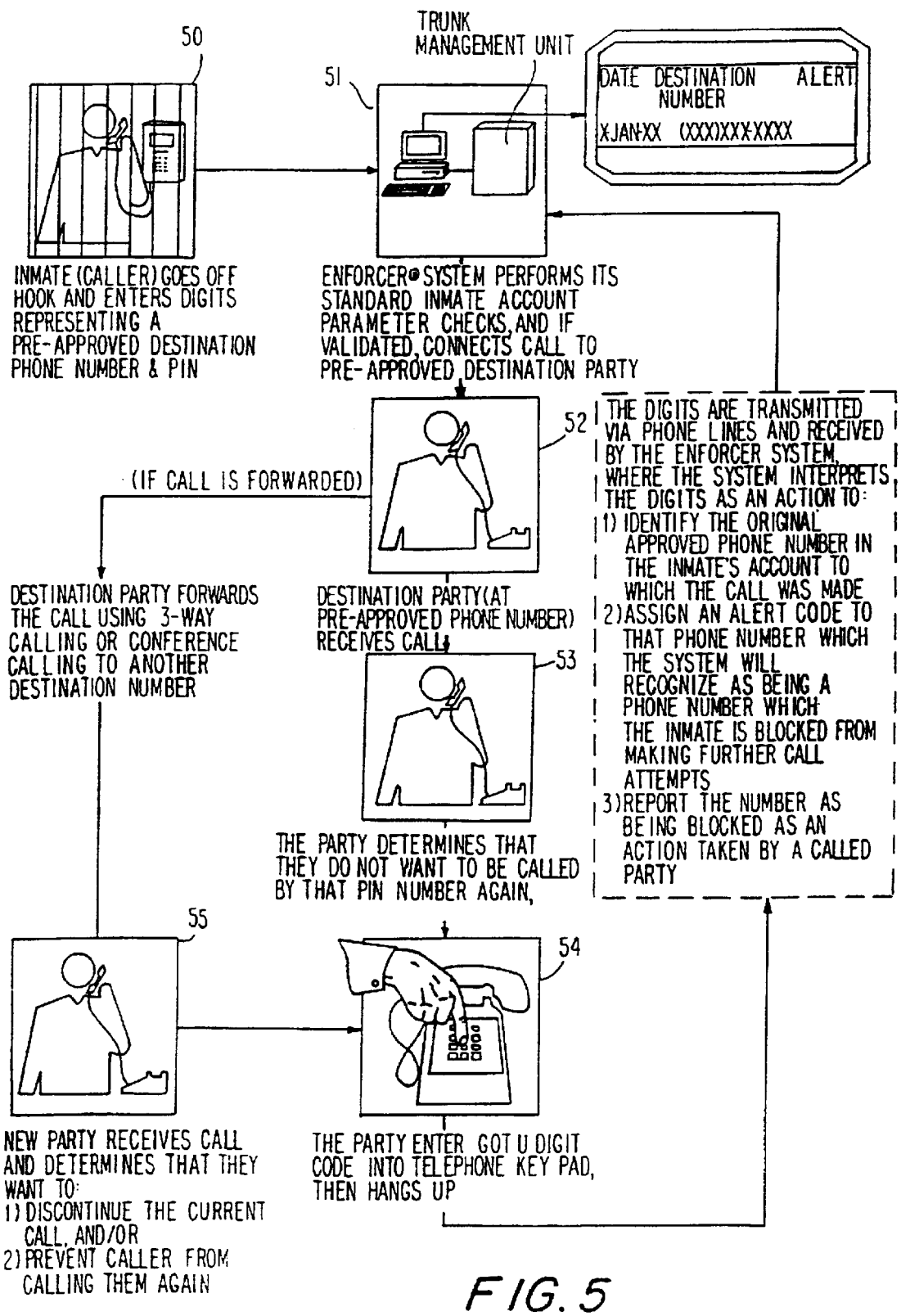
FIG. 5 is a flow diagram depicting the operation of the call qualification process, including the invention's prospective call screening (or "GOTU") feature.

Referring now to FIG. 5, the method of connecting an inmate call can now be discussed. TMU 2 continuously monitors the inmate telephones 1. To place a call, in step 50, an inmate picks up a phone and enters two numbers (in any order established by the facility): (1) his/her personal identification number (PIN); and (2) the number to be called. TMU 2 forwards both numbers to CCU 3, which, in step 51, queries the inmate's account to check whether:

(1) there are sufficient funds in the inmate's debit account to make the call (unless the call is a collect call);

(2) the particular inmate is allowed to: (a) use the particular telephone extension; (b) place calls at the given time-of-day; or (c) has exceeded a maximum number of calls or calling minutes within a given period of time; and (3) based upon the number to be called, whether the number is approved or prohibited, whether the number to be called corresponds to the inmate's attorney (in which case, the conversation will not be recorded or "live" monitored), and whether there are any time-of-day or call frequency or other restrictions on the number to be called.

If the call is rejected on the basis of (1)-(3) above, CCU 3 directs TMU 2 to play a message to the inmate (in the inmate's preferred language, determined by his/her PIN and established when the prisoner first enters the facility) explaining the reason that the call has been rejected. Assuming that the requested call has passed these initial screening tests, CCU 2 directs TMU 2 to call the destination party. Until completion of step 53 or 55, the inmate's earpiece and mouthpiece remain blocked (with respect to the called party), thereby eliminating the inmate's opportunity to interject offensive or harassing remarks. In step 52, the destination or called party receives the call and hears a prerecorded message which identifies the institution, caller and gives instructions as to how the called party may elect to receive the call and how the party may block future calls, if desired. The message may, for example, state:

"You are receiving a call from [name of inmate] at the [name of institution]. If you wish to be connected, please press [a certain digit] now and the call will be connected in [number] seconds. If you wish to prohibit future calls from [name of inmate] or anyone at [name of institution], please press G-O-T-U or 4688 . . . "

Advantageously, the pronunciation of inmate's name is stored once in the database and retrieved each time the message is generated. This eliminates the risk of an inmate interjecting a short message in place of his/her name. The pronunciation of an inmate's name may be synthesized from well-known commercially available electronic phoneme sets, or may be reproduced from a voice data file created by the actual inmate or administrator. For example, when an inmate first enters a corrections facility, he/she may be instructed to recite his/her name into a voice recorder via a microphone. Then, that voice can be stored permanently into a file associate with that inmate's calling account and/or PIN, and can be automatically replayed as desired.

In step 53, the destination party is allowed a specified time to determine whether to accept the call, hang up or press GOTU to invoke the invention's prospective call screening feature. During this period, TMU 2 monitors the line and transmits any received DTMF tones to CCU 3. If, in step 53, the destination party presses GOTU (depicted as step 54), CCU 3 stores a record in the inmate's account that prohibits the inmate from calling the destination party in the future and optionally alerts prison officials of any future attempts to place such calls. Optionally, step 54 may also prompt the destination caller as to whether he/she would like to prohibit all future calls from inmates within the particular prison or any associated prison employing the same or similar call management technology. Also, the destination caller may be prompted by any number of other alternatives. For example, the called party may be instructed to press "1" to reject all future calls from that inmate; press "2" to reject all future calls from that prison; press "3" to generate a busy signal to the inmate—in that event, the calling party (inmate) would hear a busy signal in his/her earpiece; press "4" to state that "The number you have dialed has been disconnected"; press "5" to enter certain times of the day or dates to block calls from this inmate in the future; and so forth. Also, the called party can be given the phone number of the prison telephone system service bureau, so that previously issued instructions to block calls (from particular inmates or facilities) can be erased. In any event, the called party's response is transmitted to CCU 2. If the response represents a desire to prohibit calls from all inmates, CCU 2 records a global calling restriction in the database associated with the particular institution, and if appropriate, transmits the restriction to other related institutions via a computer network. Step 55 handles forwarded calls in a similar manner. Thus, the GOTU feature serves to blocks calls from inmates, based on the number that the inmate has dialed—either by entering that number to a list of restricted numbers, or by deleting that number from a list of preapproved numbers, depending upon how the administrator has configured the inmate telephone system. In any event, the inmate will lose access to that telephone number in the future, based on the fact that the called party has entered the GOTU ("4688") keypad sequence. Optionally, the GOTU feature can also be configured to control the costs of collect calls accepted by the destination party. In that event, the destination party could, for example, in response to a voice prompt, enter a dollar value limit corresponding to the maximum permissible cost of the current inmate call. As well, any series of warning tones could be established to inform both parties that the call is approaching the dollar limit, at which point the call could be terminated, or alternatively, the destination party given the opportunity to waive or extend the preset limit.

In light of the above, one can appreciate how the GOTU feature of the present invention effectively eliminates the possibility of telephone harassment. Advantageously, the GOTU feature also finds use in a standard (i.e. non-institutional) telephone system. For example, a local telephone company may provide a service whereby a called party, after picking-up the telephone and receiving a call from an undesired caller, dials a predetermined sequence (e.g., "*GOTU") to prohibit the current, undesirable caller from ever calling again from the same line. Implementation of this feature at the local phone company level is straightforward, and can easily be accomplished using existing technology and equipment associated with the telephone circuit of the calling party.

While the invention has been described with reference to one or more preferred embodiments, such embodiments are merely exemplary and are not intended to be limiting or represent an exhaustive enumeration of all aspects of the invention. The scope of the invention, therefore, shall be defined solely by the following claims.

What is claimed is:

1. A method of managing telephone activity provided by an institutional telephone system comprising a local exchange in an institution, the method comprising:

receiving a telephone number associated with a destination party outside the institutional telephone system's local exchange over an institutional telephone from an institutional caller for placing a telephone call to the destination party;

blocking the institutional telephone and while the institutional telephone is blocked:
    calling the telephone number associated with the destination party outside the institution;
    identifying the institutional caller to the destination party; and
    providing the destination party with call-accepting options and call-blocking directions, wherein the call-blocking directions describe how to block future calls from an institutional caller set that comprises at least one of the institutional caller, at least a portion of calling parties within the institution, or at least a portion of calling parties from within more than one institution.

2. The method of claim 1, further comprising:
receiving a control code from the destination party while the institutional telephone is blocked; and
determining, in response to the received control code, whether to prohibit the institutional caller from calling the destination party in the future.

3. The method of claim 2 wherein the received control code comprises a sequence of dual-tone multi-frequency ("DTMF") tones and wherein determining whether to prohibit the institutional caller from calling the destination party in the future comprises matching the received DTMF tones to a predetermined DTMF control code sequence for call blocking.

4. The method of claim 3 wherein the predetermined DTMF control code sequence for call blocking comprises at least one of "GOTU" or "4688".

5. The method of claim 1, further comprising:
receiving a control code from the destination party while the institutional telephone is blocked; and
determining, in response to the received control code, whether to prohibit future calls to the telephone number from at least one of a portion of callers within the institution or a portion of callers within a set of institutions.

6. A method of managing telephonic communications provided by an institutional telephone system comprising a local exchange in an institution, the method comprising:
    placing a telephone call to a telephone number associated with a destination party outside the institutional telephone system's local exchange by telephony equipment associated with an institutional calling party;
    inserting call-accepting options and a call-blocking message into the telephone call to the telephone number by the telephony equipment that placed the telephone call, the call-blocking message including call-blocking directions; and
    receiving a tone-based call-blocking instruction in accordance with the call-blocking directions that requests blocking of future telephone calls to the telephone number for calls placed by an institutional caller set.

7. The method of claim 6 wherein the call-blocking instruction requests blocking of future telephone calls to the telephone number for calls placed by the institutional caller set comprising at least one of a calling party who placed the telephone call, at least a portion of calling parties within the institution, or at least a portion of calling parties from within more than one institution.

8. The method of claim 6 wherein the telephone number is associated with a first telephone and the first telephone has been forwarded to a second telephone having another telephone number such that the telephone call is established with the second telephone and wherein the call-blocking instruction blocks future telephone calls to the telephone number associated with the first telephone.

9. The method of claim 6, further comprising:
storing the call-blocking instruction for the telephone number in a data repository.

10. The method of claim 6, further comprising:
identifying a calling party to a destination party associated with the telephone number prior to inserting the call-blocking message.

11. A method of managing telephonic communications provided by an institutional telephone system comprising a local exchange in an institution, the method comprising:
    determining if a calling party has been blocked from calling a first telephone number before placing a call to the first telephone number outside the institutional telephone system's local exchange;
    calling the first telephone number to establish a telephone connection if the calling party has been determined to have not been blocked from calling the first telephone number; and
    inserting call-accepting options and a call-blocking message by the institutional telephony system into the telephone connection that provides call-blocking directions.

12. The method of claim 11, further comprising:
receiving a call-blocking instruction for the first telephone number for blocking the calling party from placing calls to the first telephone number.

13. The method of claim 11 wherein the first telephone number has been forwarded to a second telephone number, the method further comprising:
receiving a call-blocking instruction for the first telephone number from a destination party associated with the second telephone number.

14. A system of managing telephonic communications provided by an institutional telephone system comprising a local exchange in an institution, the system by comprising:
    a trunk management unit associated with the institution configured to receive a first telephone number associated with a destination party outside the institutional telephone system's local exchange, call the destination party to establish a telephone connection, insert call-accepting options and a call-blocking instruction message into the telephone connection, and receive the call-accepting options and a tone-based call-blocking instruction for a caller set from the destination party; and
    a computerized control unit configured to receive the call-blocking instruction for the first telephone number from the trunk management unit and prepare a call-blocking directive for the first telephone number that blocks future calls placed by the trunk management unit from the caller set to the first telephone number.

15. The system of claim 14 wherein the caller set comprises at least one of an institutional calling party who requested the telephone connection, more than one institutional calling party within an institution, or more than one institutional calling party within a set of institutions.

16. The system of claim 14 wherein the computerized control unit is further configured to authorize the telephone connection by reviewing previously retained call-blocking instructions to determine if the first telephone number has been blocked for the caller set and wherein the trunk management unit is further configured to wait for authorization from the computerized control unit before telephoning the first telephone number.

17. The system of claim 14 wherein the telephone connection is forwarded from the first telephone number to a second telephone number and wherein the trunk management unit is further configured to receive the call-blocking instruction for the first telephone number from the telephone connection associated with the second telephone number.

18. A system for managing telephonic communications provided by an institutional telephone system comprising a local exchange in an institution, the system comprising:

call-blocking examination means for determining if a calling party in an institution has been previously blocked from calling a first telephone number outside the institution;

call placement means for calling the first telephone number associated with a destination parry outside the institutional telephone system's local exchange to establish a telephone connection; and call-blocking message means for inserting a call-blocking message into the telephone connection that provides call-blocking directions to a called party associated with the first telephone number.

19. The system of claim 18, further comprising:

call-blocking instruction receiving means for receiving a call-blocking instruction for the first telephone number.

20. The system of claim 18 wherein the first telephone number has been forwarded to a second telephone number, the system further comprising:

call-blocking instruction receiving means for receiving a call-blocking instruction for the first telephone number from a destination party associated with the second telephone number.

21. A method of managing telephone activity provided by an institutional telephone system comprising a local exchange in an institution, the method comprising:

identifying an institutional caller who wishes to place an outside call to a destination party outside the institutional telephone system's local exchange;

blocking the institutional caller, and while the institutional caller's line remains blocked:
calling the destination party;
providing the identity of the institutional caller to the destination party using telephony equipment associated with the institution;
receiving a control code from the destination party; and determining, in response to the control code, whether to prohibit calls from a calling party group from calling the destination party in the future.

22. The method of claim 21 wherein the calling party group comprises at least one of the institutional caller, a plurality of callers from within the institution, or a plurality of callers from related institutions.

* * * * *